(12) United States Patent
Yamada et al.

(10) Patent No.: US 10,669,462 B2
(45) Date of Patent: Jun. 2, 2020

(54) ABRASIVES, POLISHING COMPOSITION, AND POLISHING METHOD

(71) Applicant: FUJIMI INCORPORATED, Kiyosu-shi, Aichi (JP)

(72) Inventors: Eiichi Yamada, Aichi (JP); Kazusei Tamai, Aichi (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

(21) Appl. No.: 15/504,779

(22) PCT Filed: Sep. 10, 2015

(86) PCT No.: PCT/JP2015/004615
§ 371 (c)(1),
(2) Date: Feb. 17, 2017

(87) PCT Pub. No.: WO2016/042744
PCT Pub. Date: Mar. 24, 2016

(65) Prior Publication Data
US 2017/0260436 A1   Sep. 14, 2017

(30) Foreign Application Priority Data

Sep. 17, 2014   (JP) .................................. 2014-189231
Apr. 13, 2015   (JP) .................................. 2015-081700

(51) Int. Cl.
*C09G 1/02* (2006.01)
*C09K 3/14* (2006.01)
(Continued)

(52) U.S. Cl.
CPC ............ *C09K 3/1454* (2013.01); *B24B 37/00* (2013.01); *C09G 1/02* (2013.01); *C09K 3/14* (2013.01); *B24B 37/11* (2013.01)

(58) Field of Classification Search
CPC ...... C09K 3/1409; C09G 1/02; C01P 2004/61; C01P 2006/12; C01P 2006/90
See application file for complete search history.

(56) References Cited

U.S. PATENT DOCUMENTS

| 4,225,349 A | * | 9/1980 | Koshiyama | .............. C09G 1/02 106/3 |
| 2004/0087248 A1 | * | 5/2004 | Hirokawa | .............. B24B 37/015 451/7 |

(Continued)

FOREIGN PATENT DOCUMENTS

| CN | 1576346 A | 2/2005 |
| CN | 1986717 A | 6/2007 |

(Continued)

OTHER PUBLICATIONS

Polishing of Anterior Composite Resin Restorations (2003) (Year: 2003).*

(Continued)

*Primary Examiner* — Hoa (Holly) Le
(74) *Attorney, Agent, or Firm* — Foley & Lardner LLP

(57) ABSTRACT

Abrasives, a polishing composition, and a polishing method that can reduce undulation of an outer surface of a resin coating by polishing with reduced occurrence of polishing flaws. The polishing composition includes abrasives of aluminium oxide particles having a specific surface area of 5 $m^2$/g or more and 50 $m^2$/g or less and an average secondary particle diameter of 0.05 μm or more and 4.8 μm or less. This polishing composition can be used for polishing an outer surface of the resin coating.

9 Claims, 1 Drawing Sheet

(51) Int. Cl.
*B24B 37/00* (2012.01)
*B24B 37/11* (2012.01)

(56) References Cited

U.S. PATENT DOCUMENTS

| | | | |
|---|---|---|---|
| 2005/0003746 A1* | 1/2005 | Fujii | C09G 1/02 451/41 |
| 2007/0149097 A1 | 6/2007 | Fujii et al. | |
| 2013/0324015 A1* | 12/2013 | Asano | B24B 37/044 451/59 |
| 2015/0291850 A1 | 10/2015 | Tamai et al. | |

FOREIGN PATENT DOCUMENTS

| | | |
|---|---|---|
| CN | 103415372 A | 11/2013 |
| EP | 2 322 322 A1 | 5/2011 |
| JP | 2004-359831 A | 12/2004 |
| JP | 2005-023266 A | 1/2005 |
| JP | 2007-277379 A | 10/2007 |
| JP | 2008-127456 A | 6/2008 |
| JP | 2008-255232 A | 10/2008 |
| JP | 2009-079228 A | 4/2009 |
| WO | WO-2014/069043 A1 | 5/2014 |

OTHER PUBLICATIONS

Xie and Bhushan, Effects of particle size, polishing pad and contact pressure in free abrasive polishing, Wear 200 (1996) 281-295 (Year: 1996).*

* cited by examiner

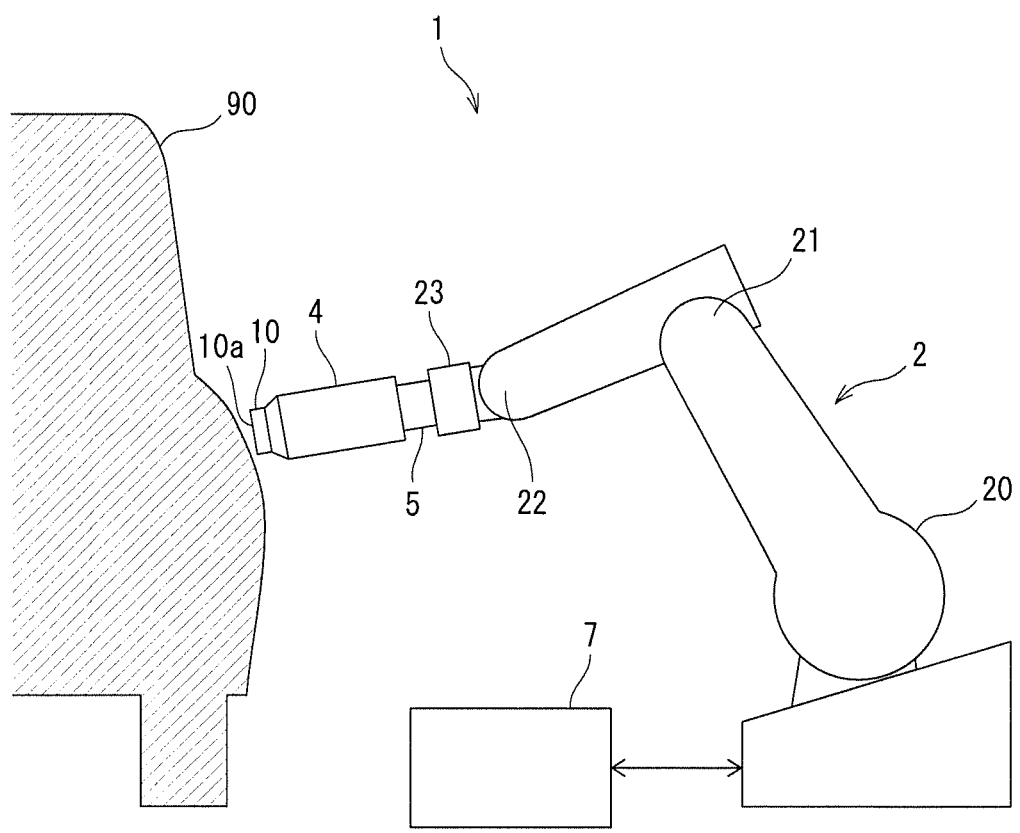

ABRASIVES, POLISHING COMPOSITION, AND POLISHING METHOD

TECHNICAL FIELD

The present invention relates to abrasives, a polishing composition, a polishing method, a coating member, and a method for producing the coating member.

BACKGROUND ART

A buff polishing process is known as a processing method for smoothing an outer surface (also referred to as a "resin-coated surface") of a resin coating covering the surface of, for example, a body of an automobile. The buff polishing process is a processing method of polishing the surface of a polishing object by pressing a rotating cloth buff, for example, against the polishing object with a polishing composition interposed between the buff and the polishing object.

The polishing composition used in the buff polishing process contains abrasives (abrasive grains) that is exemplified by alumina particles (see, for example, PTLs 1 to 3).

Such a conventional buff polishing process using a polishing composition containing abrasives, however, cannot sufficiently reduce undulation of a resin-coated surface in some cases. In addition, the conventional buff polishing process using the abrasives containing the abrasives causes polishing flaws on the polished resin-coated surface in some cases. This can cause a failure in finishing with an excellent glossy resin-coated surface.

CITATION LIST

Patent Literatures

PTL 1: JP 2008-255232 A
PTL 2: JP 2008-127456 A
PTL 3: JP 2007-277379 A

SUMMARY OF INVENTION

Technical Problem

It is therefore an object of the present invention to solve problems of conventional techniques as described above and provide abrasives, a polishing composition, and a polishing method that can reduce undulation of an outer surface of a resin coating with suppressed occurrence of polishing flaws.

Solution to Problem

To solve the problems described above, a gist of abrasives according to an aspect of the present invention resides in abrasives for use in polishing an outer surface of a resin coating, and the abrasives include particles of aluminium oxide having a specific surface area of 5 $m^2/g$ or more and 50 $m^2/g$ or less and an average secondary particle diameter of 0.05 μm or more and 4.8 μm or less.

In the abrasives according to the aspect, the aluminium oxide may have an α-phase conversion rate of 40% or more.

A gist of a polishing composition according to another aspect of the present invention resides in containing the abrasives according to the above aspect.

In this polishing composition according to the aspect, a content of the abrasives may be 0.1 mass % or more and 50 mass % or less.

A gist of a polishing method according to yet another aspect of the present invention resides in polishing an outer surface of a resin coating using the polishing composition according to the above aspect.

In the polishing method according to the aspect, polishing may be performed with a polishing temperature kept at a temperature less than or equal to a glass transition point of a resin constituting the resin coating.

In the polishing method according to the aspect, polishing may be performed with a polishing temperature kept at 50° C. or less.

In the polishing method according to the aspect, polishing may be performed with a polishing pad having a soft polishing surface.

In the polishing method according to the aspect, a first-stage polishing may be performed with a second polishing pad having a polishing surface harder than the soft polishing surface of the polishing pad, and thereafter, a second-stage polishing may be performed with the polishing pad having the soft polishing surface.

In the polishing method according to the aspect, polishing may be performed with a compressive force of the polishing surface on the outer surface of the resin coating being kept constant.

A gist of a coating member according to a still another aspect of the present invention resides in a coating member in which a surface of a base material is covered with a resin coating, and an outer surface of the resin coating is polished using the polishing composition according to the above aspect.

A method for producing a coating member according to a still another aspect of the present invention resides in a method for producing a coating member in which a surface of a base material is covered with a resin coating, and the method includes the step of polishing an outer surface of the resin coating of the coating member using the polishing composition according to the above aspect.

Advantageous Effects of Invention

Abrasives, a polishing composition, and a polishing method according to the present invention can reduce undulation of an outer surface of a resin coating and suppress occurrence of polishing flaws.

BRIEF DESCRIPTION OF DRAWING

FIG. 1 illustrates a configuration of an automatic polishing apparatus for use in a polishing method according to an embodiment of the present invention.

DESCRIPTION OF EMBODIMENT

An embodiment of the present invention will be described in detail. Abrasives according to this embodiment are preferably used for polishing (e.g., buff polishing) an outer surface of a resin coating (resin-coated surface), and include particles of aluminium oxide ($Al_2O_3$) having a specific surface area of 5 $m^2/g$ or more and 50 $m^2/g$ or less and an average secondary particle diameter of 0.05 μm or more and 4.8 μm or less. With a specific surface area of 5 $m^2/g$ or more and 50 $m^2/g$ or less, polishing using this abrasives can reduce undulation of the resin-coated surface and suppress occurrence of polishing flaws on the resin-coated surface. Thus, an excellent glossy resin-coated surface can be obtained. The specific surface area of aluminium oxide is preferably 8 $m^2/g$ or more and 45 $m^2/g$ or less, and more preferably 10 m²/g or more and 40 m²/g or less. The specific surface area of aluminium oxide can be measured by, for example, a BET method.

In a case where aluminium oxide particles have an average secondary particle diameter of 0.05 µm or more and 4.8 µm or less, a polished resin-coated surface has a small surface roughness, and polishing flaws such as scratches are less likely to occur on the polished resin-coated surface. The average secondary particle diameter of aluminium oxide is preferably 0.1 µm or more and 4.0 µm or less, and more preferably 0.2 µm or more and 3.5 µm or less. The average secondary particle diameter of aluminium oxide is measured with, for example, a laser diffraction particle size analyzer LA-950 manufactured by HORIBA, Ltd.

The aluminium oxide may have an α-phase conversion rate or 40% or more. With an α-phase conversion rate of 40% or more, polishing can be performed at a high polishing rate. The aluminium oxide preferably has an α-phase conversion rate of 45% or more, and more preferably 50% or more.

The method for producing aluminium oxide particles is not limited to a specific method, but aluminium oxide having properties as described above can be produced by a method of obtaining aluminium hydroxide with a Bayer process (wet process) and then changing the aluminium hydroxide into aluminium oxide with a heat treatment.

Such abrasives can be used as abrasive grains of a polishing composition suitable for polishing (e.g., buff polishing) a resin-coated surface. That is, a polishing composition according to this embodiment includes the abrasives described above. Polishing of a resin-coated surface using this polishing composition can reduce undulation of the resin-coated surface and suppress occurrence of polishing flaws on the resin-coated surface. Thus, an excellent glossy resin-coated surface can be obtained.

A content of the abrasives may be 0.1 mass % or more and 50 mass % or less of the entire polishing composition. With abrasives content of 0.1 mass % or more, the resin-coated surface can be polished at a high polishing rate. With abrasives content of 50 mass % or less, costs for the polishing composition can be reduced, and occurrence of polishing flaws on the polished resin-coated surface can be further suppressed. The abrasives content is preferably 0.5 mass % or more and 40 mass % or less, and more preferably 1.0 mass % or more and 30 mass % or less.

The resin coating is not specifically limited to a specific type. Examples of a resin constituting the resin coating include an urethane resin and an acrylic resin. The resin coating may be a transparent clear coating. A thickness of the resin coating is not limited to a specific value, and may be 100 µm or less or in the range from 10 µm to 40 µm, inclusive.

The polishing composition according to this embodiment can be used for producing a coating member in which a surface of a base material is covered with a resin coating. Polishing of an outer surface of the resin coating of the coating member using the polishing composition according to this embodiment can obtain a coating member including an excellent glossy resin coating with small undulation and polishing flaws.

The type of the coating member (e.g., application of the resin coating) is not limited to a specific type, and the coating member may be applied to, for example, automobile bodies, railway vehicles, aircrafts, and resin members. A resin coating covering the surface of an automobile body has a large area and a curved surface. The abrasives and the polishing composition according to this embodiment are suitable for polishing an outer surface of such a resin coating.

Specific examples of a material for the base material include an iron alloy such as stainless steel, an aluminium alloy, and a resin. The iron alloy is used as, for example, a steel plate for general vehicles including automobiles. Stainless steel, for example, is used for railway vehicles. The steel plate may be provided with a surface coating. The aluminium alloy is used for parts of, for example, automobiles and aircrafts. The resin is used for a resin member such as a bumper.

The polishing composition can be produced by mixing abrasives and a liquid medium such as water or an organic solvent. The liquid medium functions as a dispersion medium or a solvent for dispersing or dissolving components (e.g., aluminium oxide particles and an additive) of the polishing composition. Examples of the liquid medium include water and an organic solvent. One type of the liquid medium may be used alone or two or more types of liquid media may be used in combination. The liquid medium preferably contains water. From the viewpoint of preventing inhibition of functions of the components, water containing impurities as small as possible is preferably used. Specifically, pure water or ultrapure water obtained by removing impurity ions with ion ion-exchange resin and filtering the water to remove foreign matter or distilled water is preferable.

Various additives such as a pH adjuster, a surfactant, a polishing accelerator, an oxidizing agent, a dispersant, a viscosity modifier, a complexing agent, a corrosion inhibitor, and/or a fungicide may be added in the polishing composition according to this embodiment, as needed, in order to enhance performance thereof. Examples of additives that may be added to the polishing composition according to this embodiment will be described below.

(1) pH Adjuster

The pH of the polishing composition can be adjusted by adding a pH adjuster. A pH adjuster used for adjusting the pH of the polishing composition to a desired value as necessary may be any of acid or alkaline, and may be any of an inorganic compound or an organic compound.

Specific examples of acid as the pH adjuster include inorganic acid and organic acid such as carboxylic acid and organic sulfonic acid. Specific examples of inorganic acid include sulfuric acid, nitric acid, boric acid, carbonic acid, hypophosphorous acid, phosphorous acid, and phosphoric acid. Examples of carboxylic acid include formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid. Specific examples of organic sulfonic acid include methanesulfonic acid, ethanesulfonic acid, and isethionic acid. One type of these acids may be used alone, or two or more types of these acids may be used in combination.

Specific examples of a base as a pH adjuster include hydroxides of alkali metals and salts thereof, hydroxides of alkali earth metals and salts thereof, quaternary ammonium hydroxide and a salt thereof, ammonia, and amine.

Specific examples of alkali metals include potassium and sodium. Specific examples of alkali earth metals include calcium and strontium. Specific examples of salts include carbonate, hydrogencarbonate, sulfate, and acetate. Specific examples of quaternary ammonium include tetramethylammonium, tetraethylammonium, and tetrabutylammonium.

Examples of the quaternary ammonium hydroxide compound include quaternary ammonium hydroxide and a salt thereof, and specific examples thereof include tetramethylammonium hydroxide, tetraethylammonium hydroxide, and tetrabutylammonium hydroxide.

Specific examples of amine include methylamine, dimethylamine, trimethylamine, ethylamine, diethylamine, triethylamine, ethylenediamine, monoethanolamine, N-($\beta$-aminoethyl) ethanol amine, hexamethylenediamine, diethylenetriamine, triethylenetetramine, anhydrous piperazine, piperazine hexahydrate, 1-(2-aminoethyl)piperazine, N-methylpiperazine, and guanidine.

One type of these bases may be used alone, or two or more types of these bases may be used in combination.

Among these bases, ammonia, ammonium salts, alkali metal hydroxide, alkali metal salts, quaternary ammonium hydroxide compounds, and amines are preferable, and ammonia, potassium compounds, sodium hydroxide, quaternary ammonium hydroxide compounds, ammonium hydrogen carbonate, ammonium carbonate, sodium hydrogen carbonate, and sodium carbonate are more preferable.

The polishing composition more preferably includes a potassium compound as a base from the viewpoint of preventing metal pollution. Examples of the potassium compounds include hydroxides of potassium and potassium salts, and specifically include potassium hydroxide, potassium carbonate, potassium hydrogencarbonate, potassium sulfate, potassium acetate, and potassium chloride.

Instead of, or in combination with, the acids described above, a salt such as the ammonium salt of the acid or the alkali metal salt may be used as a pH adjuster serving as a buffer. In particular, in a case where a combination of the acid and the buffer is a combination of a weak acid and a strong base, a combination of a strong acid and a weak base, or a combination of a weak acid and a weak base, a buffer function of pH is expected.

(2) Surfactant

A surfactant may be added in the polishing composition. The surfactant has the function of providing hydrophilicity to a polished resin-coated surface, and thus, can increase a cleaning efficiency of the polished resin-coated surface to reduce attachment of a stain, for example. As the surfactant, any one of an anionic surfactant, a cationic surfactant, an amphoteric surfactant, or a nonionic surfactant may be used.

Specific examples of the anionic surfactant include polyoxyethylene alkyl ether acetic acid, polyoxyethylene alkylsulfuric acid ester, alkylsulfuric acid ester, polyoxyethylene alkylsulfuric acid, alkylsulfuric acid, alkyl benzenesulfonic acid, alkyl phosphate ester, polyoxyethylene alkylphosphate ester, polyoxyethylene sulfosuccinate, alkyl sulfosuccinate, alkyl naphthalene sulfonate, alkyl diphenyl ether disulfonate, and salts thereof.

Specific examples of the cationic surfactant include an alkyltrimethylammonium salt, an alkyldimethylammonium salt, an alkylbenzildimethylammonium salt, and an alkylamine salt.

Specific examples of the amphoteric surfactant include alkylbetaine and alkylamine oxide.

Specific examples of the nonionic surfactant include polyoxyethylene alkyl ether, polyoxyalkylene alkyl ether, sorbitan fatty acid ester, glycerin fatty acid ester, polyoxyethylene fatty acid ester, polyoxyethylene alkylamine, and alkyl alkanolamide.

One type of these surfactants may be used alone, or two or more types of the surfactants may be used in combination.

(3) Polishing Accelerator (Oxydizing Agent)

A polishing accelerator may be added in the polishing composition. The polishing accelerator accelerates chemical polishing of a polishing object and acts on the outer surface of the resin coating, thereby significantly increasing a processing efficiency.

Specific examples of the polishing accelerator include at least one salt selected from the group consisting of a metal salt of inorganic acid, a metal salt of organic acid, an ammonium salt of inorganic acid, and an ammonium salt of organic acid.

The inorganic acid may be any one of nitric acid, sulfuric acid, or hydrochloric acid. The organic acid may be any one of oxalic acid, lactic acid, acetic acid, formic acid, citric acid, tartaric acid, malic acid, gluconic acid, glycolic acid, or malonic acid. The metal salt may be any one of an aluminum salt, a nickel salt, a lithium salt, a magnesium salt, a sodium salt, or a potassium salt.

One type of these polishing accelerators may be used alone, or two or more types of the polishing accelerators may be used in combination.

As a polishing accelerator, an oxidizing agent may be added. Specific examples of the oxidizing agent include hydrogen peroxide, peroxide, nitrate, iodate, periodate, hypochlorite, chlorite, chlorate, perchlorate, persulfate, dichromate, permanganate, ozonated water, a silver (II) salt, and an iron (III) salt.

(4) Dispersant/Viscosity Modifier (Thickener)

A dispersant and/or a viscosity modifier (thickener) may be added in the polishing composition. With the effect of the dispersant or the thickener, abrasives are uniformly dispersed in liquid and, thereby, efficiently act on a polishing object. The presence of the dispersant or the thickener between the abrasives is expected to suppress caking of abrasive grains. This can reduce occurrence of scratches caused by agglomerated abrasives.

Specific examples of the dispersant include a colloidal substance including fine particles. Examples of the colloidal substance include colloidal alumina, colloidal silica, colloidal zirconia, colloidal titania, alumina zol, silica zol, zirconia zol, titania zol, fumed alumina, fumed silica, fumed zirconia, and fumed titania. Sodium phosphate, sodium hexametaphosphate, and sodium pyrophosphate that are generally used as dispersants, for example, may also be used.

Specific examples of the thickener include glycols such as propylene glycol polymer and ethylene glycol polymer, and high molecular compounds. Specific examples of the glycols include propylene glycol, ethylene glycol, dipropylene glycol, polypropylene glycol, diethylene glycol, and polyethylene glycol. Examples of the high molecular compounds include sodium polyacrylic acid, polyvinyl alcohol, and hydroxyethyl cellulose.

(5) Complexing Agent

An agent having a chelate function (complexing agent) may be added in the polishing composition. The complexing agent confines metal ions, for example, derived from a polishing apparatus or a polishing object, and thus, is expected to reduce metal pollution of a polished surface caused by metal ions and to obtain an excellent polished surface.

Examples of the complexing agent include organic acid, amino acid, a nitrile compound, and other chelating agents. Specific examples of the organic acid include oxalic acid, malonic acid, succinic acid, glutaric acid, adipic acid, pimelic acid, maleic acid, phthalic acid, malic acid, tartaric acid, and citric acid. Instead of, or in combination with, organic acid, a salt such as an alkali metal salt of organic acid may be used.

Specific examples of the amino acid include glycin, α-alanine, β-alanine, N-methylglycin, N,N-dimethylglycin, 2-aminobutyric acid, norvaline, valine, leucine, norleucine, isoleucine, phenylalanine, proline, sarcosine, ornithine, lycine, taurine, serine, threonine, homoserine, tyrosine, vicine, tricine, 3,5-diiodo-tyrosine, β-(3,4-dihydroxyphenyl)-alanine, thyroxine, 4-hydroxy-proline, cysteine, methionine, ethionine, lanthionine, cystathionine, cystine, cysteic acid, aspartic acid, glutamic acid, S-(carboxymethyl)-cysteine, 4-aminobutyric acid, asparagine, glutamine, azaserine, arginine, canavanine, citrulline, δ-hydroxy-lycine, creatine, histidine, 1-methyl-histidine, 3-methyl-histidine, and tryptophan.

Specific examples of the nitrile compound include acetonitrile, aminoacetonitrile, propionitrile, butyronitrile, isobtyronitrile, benzonitrile, glutarodinitrile, and methoxyacetonitrile.

Specific examples of the other chelating agents include iminodiacetic acid, nitrilotriacetic acid, diethylenetriamine pentaacetic acid, ethylenediaminetetraacetic acid, N,N,N-trimethylene phosphonic acid, ethylenediamine-N,N,N',N'-tetramethylenesulfonic acid, transcyclohexanediaminetetraacetic acid, 1,2-diaminopropanetetraacetic acid, glycol etherdiaminetetraacetic acid, ethylene diamine orthohydroxyphenylacetic acid, ethylene diamine disuccinic acid (SS-form), N-(2-carboxylate ethyl)-L-aspartic acid, β-alaninediacetic acid, 2-phosphonobutane-1,2,4-tricarboxylic acid, 1-hydroxyethylidene-1,1-diphosphonic acid, N,N'-bis (2-hydroxybenzil)ethylene diamine-N,N'-diacetic acid, and 1,2-dihydroxybenzene-4,6-disulfonate.

One type of these complexing agents may be used alone, or two or more types of the complexing agents may be used in combination.

(6) Corrosion Inhibitor

A corrosion inhibitor may be added in the polishing composition. The corrosion inhibitor forms a protective film on a metal surface, and thus, is expected to prevent corrosion of, for example, a polishing apparatus, a polishing object, and a fixing jig.

A usable corrosion inhibitor is not limited to a specific type, and is, for example, a heterocyclic compound or a surfactant. The number of heterocycles in the heterocyclic compound is not limited to a specific number. The heterocyclic compound may be a monocyclic compound or a polycyclic compound having a condensed ring. One type of the corrosion inhibitors may be used alone, or two or more types of the corrosion inhibitors may be used in combination.

Specific examples of the heterocyclic compound usable as a corrosion inhibitor include nitrogen-containing heterocyclic compounds such as a pyrrole compound, a pyrazole compound, an imidazole compound, a triazole compound, a tetrazole compound, a pyridine compound, a pyrazine compound, a pyridazine compound, a pyrindine compound, an indolizine compound, an indole compound, an isoindole compound, an indazole compound, a purine compound, a quinolizine compound, a quinoline compound, an isoquinoline compound, a naphthyridine compound, a phthalazine compound, a quinoxaline compound, a quinazoline compound, a cinnoline compound, a buteridin compound, a thiazole compound, an isothiazole compound, an oxazole compound, an isooxazole compound, and a furazan compound.

(7) Fungicide and Preservative

A fungicide and/or a preservative may be added in the polishing composition. Specific examples of the fungicide or the preservative include an isothiazolin-based preservative (e.g., 2-methyl-4-isothiazolin-3-one or 5-chloro-2-methyl-4-isothiazolin-3-one), paraoxybenzoate esters, and phenoxyethanol. One type of these fungicides and preservatives may be used alone, or two or more types of the fungicides and preservatives may be used in combination.

The polishing composition according to this embodiment can be used for polishing a resin-coated surface. An example of a method for polishing a resin-coated surface will be described. The polishing apparatus for such polishing is not limited to a specific configuration, and a general polishing apparatus may be used. For example, an automatic polishing apparatus 1 illustrated in FIG. 1 may be used.

The automatic polishing apparatus 1 illustrated in FIG. 1 includes a robot arm 2, a polishing pad 10, a polishing tool 4, a compressive force detector 5, and a controller 7. The robot arm 2 includes a plurality of joints 20, 21, and 22, and thereby, can move a front end 23 provided with the polishing pad 10, the polishing tool 4, and the compressive force detector 5 in a plurality of directions. A polishing object 90 (corresponding to a "coating member" as a constituent of the present invention) may be, for example, a body of an automobile or the like having a surface covered with a resin coating. The resin-coated surface of the body of the automobile or the like has a large area and a curved surface.

The polishing tool 4 is attached to the front end 23 with the compressive force detector 5 interposed therebetween, and causes the polishing pad 10 to rotate about a rotation axis perpendicular to a polishing surface 10a of the polishing pad 10 by using an incorporated driving unit. The controller 7 controls a behavior of the robot arm 2 and rotation of the polishing pad 10 by the polishing tool 4. An unillustrated polishing composition supply mechanism supplies a polishing composition to a gap between the polishing surface 10a of the polishing pad 10 and a resin-coated surface of the polishing object 90.

The controller 7 presses the polishing surface 10a of the polishing pad 10 against the resin-coated surface of the polishing object 90 with the robot arm 2, thereby polishing the resin-coated surface of the polishing object 90. The compressive force detector 5 detects a compressive force of the polishing surface 10a of the polishing pad 10 on the resin-coated surface of the polishing object 90. The controller 7 may adjust a force of pressing the polishing surface 10a against the resin-coated surface of the polishing object 90, based on the compressive force detected by the compressive force detector 5. The controller 7 may control the robot arm 2 so that the polishing pad 10 moves on the resin-coated surface of the polishing object 90 with a compressive force of the polishing surface 10a on the resin-coated surface of the polishing object 90 being kept constant, based on the compressive force detected by the compressive force detector 5.

An application of the polishing method according to this embodiment, however, is not limited to the automatic polishing apparatus 1. For example, the polishing method according to this embodiment may be applied to the case of polishing a resin-coated surface by attaching a polishing pad to a tip of a hand polisher and manually moving the hand polisher by a polishing operator.

The resin-coated surface may be polished with a polishing temperature kept at a temperature less than or equal to a glass transition point of a resin constituting the resin coating. The resin coating (especially a self-repairing coating) is vulnerable to a temperature change, and it is difficult to polish the resin coating appropriately. The polishing, however, can be appropriately performed with the polishing temperature kept at a temperature less than or equal to the glass transition point of the resin constituting the resin coating. That is, undulation of the resin-coated surface can be more easily reduced, and polishing flaws are less likely to occur on the resin-coated surface. Thus, the resin-coated surface can be more easily finished with excellent gloss. Specifically, polishing is preferably performed with the polishing temperature kept at 50° C. or less (preferably 30° C. or less).

A method for measuring the polishing temperature is not limited to a specific method. For example, the polishing temperature can be obtained by measuring a temperature of the polishing surface 10a of the polishing pad 10 with, for example, an infrared radiation thermometer after completion of the polishing.

The polishing pad 10 is not limited to a specific material, and may be made of, but not limited to, general nonwoven fabrics, suede, a polyurethane foam, a polyethylene foam, or a porous fluorocarbon resin, for example. As the polishing pad 10, a polishing pad including the polishing surface 10a with a groove in which a liquid polishing composition remains may be used.

In polishing the resin-coated surface, polishing may be performed with a polishing pad having a soft polishing surface. The soft polishing surface preferably has a type A hardness according to JIS K 6253, which is preferably less than 50 and more preferably 40 or less, for example. The soft polishing surface preferably has a type A hardness of 30 or more, for example. In such ranges, surface roughness of the resin-coated surface can be reduced.

The polishing pad having the soft polishing surface is not limited to a specific material and may be made of any material having the above-described hardness, which is exemplified by nonwoven fabric and suede.

Alternatively, in polishing the resin-coated surface, a first-stage polishing using a second polishing pad whose polishing surface is harder than a soft polishing surface of a first polishing pad may be performed, following a second-stage polishing using the first polishing pad having the soft polishing surface.

The hardness of the soft polishing surface of the first polishing pad is a type A hardness according to JIS K 6253, and is preferably less than 50 and more preferably 40 or less, for example. The soft polishing surface of the first polishing pad preferably has a type A hardness of 30 or more, for example. In such ranges, the surface roughness of the resin-coated surface can be further reduced.

The hardness of the hard polishing surface of the second polishing pad is higher than the hardness of the soft polishing surface of the first polishing pad, and is a type A hardness according to JIS K 6253, and preferably 50 or more and more preferably 60 or more, for example. The hardness of the hard polishing surface of the second polishing pad is a type A hardness of preferably 95 or less and more preferably 80 or less, for example. In such ranges, undulation of the resin-coated surface can be more easily reduced.

The first polishing pad is not limited to a specific material and may be made of any material having the above-described hardness, which is exemplified by nonwoven fabric and suede. The second polishing pad is not limited to a specific material and may be made of any material having the above-described hardness, which is exemplified by a polyurethane foam and nonwoven fabric.

In addition, in polishing the resin-coated surface, the polishing is preferably performed with a compressive force of the polishing surface 10a of the polishing pad 10 on the resin-coated surface being kept constant. This polishing enables the entire resin-coated surface to be uniformly polished.

The method for supplying the polishing composition to a gap between the polishing surface 10a of the polishing pad 10 and the resin-coated surface of the polishing object 90 is not limited to a specific method, and a method of continuously supplying the polishing composition with, for example, a pump may be employed. Although the amount of supply of the polishing composition is not limited, the polishing surface 10a of the polishing pad 10 is preferably always covered with the polishing composition. In polishing the resin-coated surface of the polishing object 90, the polishing may be performed by using an undiluted solution of the polishing composition according to this embodiment without modification, but the polishing may be performed by using a dilution of the polishing composition obtained by diluting the undiluted solution to, for example, twice or more with a diluent of, for example, water.

EXAMPLES

Examples and comparative examples will be described below for further specific description of the invention. Polishing compositions of Examples 1 to 8 and Comparative Examples 1 to 5 were prepared by mixing 10 mass % of abrasives and 90 mass % of water. A resin-coated surface was polished using these compositions for polishing. Each abrasive was made of aluminium oxide particles having an average secondary particle diameter, a specific surface area, and an α-phase conversion rate as indicated in Table 1.

TABLE 1

| | Average secondary particle diameter (μm) | Specific surface area (m²/g) | α-phase conversion rate (%) | Polishing rate | Surface roughness Ra | Scratch |
|---|---|---|---|---|---|---|
| Example 1 | 0.3 | 24.6 | 94 | ○ | ◎ | ◎ |
| Example 2 | 0.3 | 12.3 | 73 | ○ | ◎ | ◎ |
| Example 3 | 0.4 | 20.7 | 81 | ○ | ○ | ◎ |
| Example 4 | 0.5 | 18.5 | 58 | ○ | ◎ | ◎ |
| Example 5 | 0.5 | 11.7 | 73 | ◎ | ○ | ○ |
| Example 6 | 0.7 | 41.1 | 48 | ○ | ◎ | ◎ |
| Example 7 | 3.1 | 8.9 | 73 | ◎ | ○ | ○ |
| Example 8 | 3.6 | 49.3 | 38 | ○ | ○ | ○ |
| Comparative Example 1 | 1.3 | 64.0 | 36 | X | ○ | ○ |
| Comparative Example 2 | 4.9 | 11.2 | 35 | X | ○ | X |
| Comparative Example 3 | 5.1 | 15.2 | 64 | ◎ | X | X |
| Comparative Example 4 | 14.1 | 19.1 | 74 | ◎ | X | X |
| Comparative Example 5 | 4.9 | 22.5 | 72 | ◎ | X | X |

The average secondary particle diameter in Table 1 was measured with a laser diffraction particle size analyzer LA-950 manufactured by HORIBA, Ltd. The specific surface area was measured with a Flow SorbII 2300 manufactured by Micromeritics. The α-phase conversion rate was measured from an integrated intensity ratio of a (113) plane diffraction pattern obtained by an X-ray diffraction analysis.

The polishing object was a metal plate provided with a clear coating and having a surface covered with a resin coating (having a thickness of 20 μm) of a urethane resin. The polishing apparatus used was AL-2 manufactured by Udagawa Optical Machines Co., Ltd. and the polishing pad used was a polishing pad SURFIN 001-02 manufactured by FUJIMI INCORPORATED. The hardness of the polishing surface was a type A hardness of 44. Other polishing conditions are listed below. The polishing temperature was obtained by measuring a temperature of a polishing surface of the polishing pad after polishing with an infrared thermometer.

Polishing pressure: 11.3 kPa
Rotation rate of surface plate: 130 $min^{-1}$
The amount of supply of polishing composition: 5 mL/min
Polishing time: 5 minutes
Polishing temperature: 23° C.

After polishing of the resin-coated surface of the polishing object has been finished, a polishing rate, a surface roughness Ra of the resin-coated surface, and the number of scratches on the resin-coated surface were evaluated. The results are indicated in Table 1.

The polishing rate was calculated from a change of mass of the polishing object before and after the polishing. In Table 1, a result in which the polishing rate was 1.3 μm/min or more is marked as a double circle (⊚), a result in which the polishing rate was 0.3 μm/min or more and less than 1.3 μm/min is marked as a circle (○), and a result in which the polishing rate was less than 0.3 μm/min is marked as a cross (x).

In Table 1, a result in which the surface roughness Ra of the resin-coated surface was 90 nm or less is marked as a double circle (⊚), a result in which the surface roughness Ra was more than 90 nm and less than 150 nm is marked as a circle (○), and a result in which the surface roughness Ra was 150 nm or more is marked as a cross (x). The surface roughness Ra of the resin-coated surface was measured by a 3D Laser Scanning Microscope VK-X200 manufactured by KEYENCE CORPORATION.

In Table 1, a result in which the number of scratches was 10 or less per 100 $cm^2$ is marked as a double circle (⊚), a result in which the number of scratches was 11 or more and 50 or less is marked as a circle (○), and a result in which the number of scratches was 51 or more is marked as a cross (x). A scratch herein refers to a linear polishing flaw, and was measured by visual observation under irradiation (luminance: 10000 1x) with white light from a halogen lamp.

REFERENCE SIGNS LIST 10 polishing pad
10a polishing surface

The invention claimed is:

1. A polishing method comprising polishing an outer surface of a resin coating using a polishing composition containing a polishing material including particles of aluminium oxide having a specific surface area of 5 $m^2/g$ or more and 50 $m^2/g$ or less and an average secondary particle size of 0.05 μm or more and 4.8 μm or less, wherein the aluminium oxide has an α-phase content of 40% or more.

2. The polishing method according to claim 1, wherein polishing is performed with a polishing temperature kept at a temperature less than or equal to a glass transition point of a resin constituting the resin coating.

3. The polishing method according to claim 1, wherein the polishing is performed with a polishing temperature kept at 50° C. or less.

4. The polishing method according to claim 1, wherein the polishing is performed with a polishing pad having a soft polishing surface.

5. The polishing method according to claim 4, wherein a first-stage polishing is performed with a second polishing pad having a polishing surface harder than the soft polishing surface of the polishing pad, and thereafter, a second-stage polishing is performed with the polishing pad having the soft polishing surface.

6. The polishing method according to claim 4, wherein polishing is performed with a compressive force of the polishing surface on the outer surface of the resin coating being kept constant.

7. A coating member in which a surface of a base material is covered with a resin coating, wherein an outer surface of the resin coating is polished using the polishing composition according to claim 1.

8. A method for producing a coating member in which a surface of a base material is covered with a resin coating, the method comprising the step of polishing an outer surface of the resin coating of the coating member using the polishing composition according to claim 1.

9. The polishing method according to claim 1, wherein a content of the polishing material is 0.1 mass % or more and 50 mass % or less.

* * * * *